(12) United States Patent
Kunz-Vizenetz

(10) Patent No.: US 6,894,487 B2
(45) Date of Patent: May 17, 2005

(54) ANGLE OF ROTATION SENSOR

(75) Inventor: Thomas Kunz-Vizenetz, Putzbrunn (DE)

(73) Assignee: Tech3 e.K., Putzbrunn (DE)

( * ) Notice: Subject to any disclaimer, the term of this patent is extended or adjusted under 35 U.S.C. 154(b) by 0 days.

(21) Appl. No.: 10/909,264

(22) Filed: Jul. 29, 2004

(65) Prior Publication Data

US 2005/0030012 A1 Feb. 10, 2005

(30) Foreign Application Priority Data

Jul. 29, 2003 (DE) .......................................... 103 34 869

(51) Int. Cl.$^7$ ................................................. G01B 7/30
(52) U.S. Cl. ............................. 324/207.25; 324/207.23
(58) Field of Search ........................ 324/207.11, 207.12, 324/207.2, 207.21, 207.23, 207.25, 174, 243; 123/612, 617

(56) References Cited

U.S. PATENT DOCUMENTS 6,411,082 B2   6/2002   Glasson

FOREIGN PATENT DOCUMENTS

| AT | 004639 U1 | 10/2000 |
|----|-----------|---------|
| DE | 3703591 | 8/1988 |
| DE | 3935261 | 5/1990 |
| DE | 3907442 A1 | 9/1990 |
| DE | 4100666 | 5/1992 |
| DE | 4301704 | 7/1994 |
| DE | 4422868 | 1/1996 |
| DE | 4437939 | 5/1996 |
| DE | 19506938 | 8/1996 |
| DE | 19539134 | 4/1997 |
| DE | 19739823 | 3/1999 |
| DE | 19813569 | 4/1999 |
| DE | 19747753 | 5/1999 |
| DE | 19802381 A1 | 8/1999 |
| DE | 19908036 A1 | 8/2000 |
| DE | 19962241 | 7/2001 |
| DE | 10140710 | 1/2003 |
| EP | 0386334 | 9/1990 |
| JP | 60-124313 | 12/1986 |
| JP | 10-010190 | 8/1999 |

*Primary Examiner*—Bot LeDynh
(74) *Attorney, Agent, or Firm*—Senniger Powers

(57) ABSTRACT

An angle of rotation sensor includes a rotary shaft coupled to a permanent magnet. A magnet-sensitive sensor element generates a sinusoidal output signal and a cosinusoidal output signal ($V_x$, $V_y$) as a function of the relative angle of rotation (a) between magnet and sensor element. Evaluation electronics generate from the output signals a signal corresponding to the angle of rotation. When the shaft rotates about its axis it moves linearly parallel to its axis along a guide track, and changes the distance between the magnet and sensor. From the sensor signals, a signal (B(z)) is determined, which corresponds to the magnitude of the field strength dependent on the distance. From this signal, a gross signal is determined, from which the number (n) of rotations can be determined. From the sinusoidal and cosinusoidal sensor signals, a fine signal is determined, which is added to the number of rotations multiplied by 360°.

18 Claims, 4 Drawing Sheets

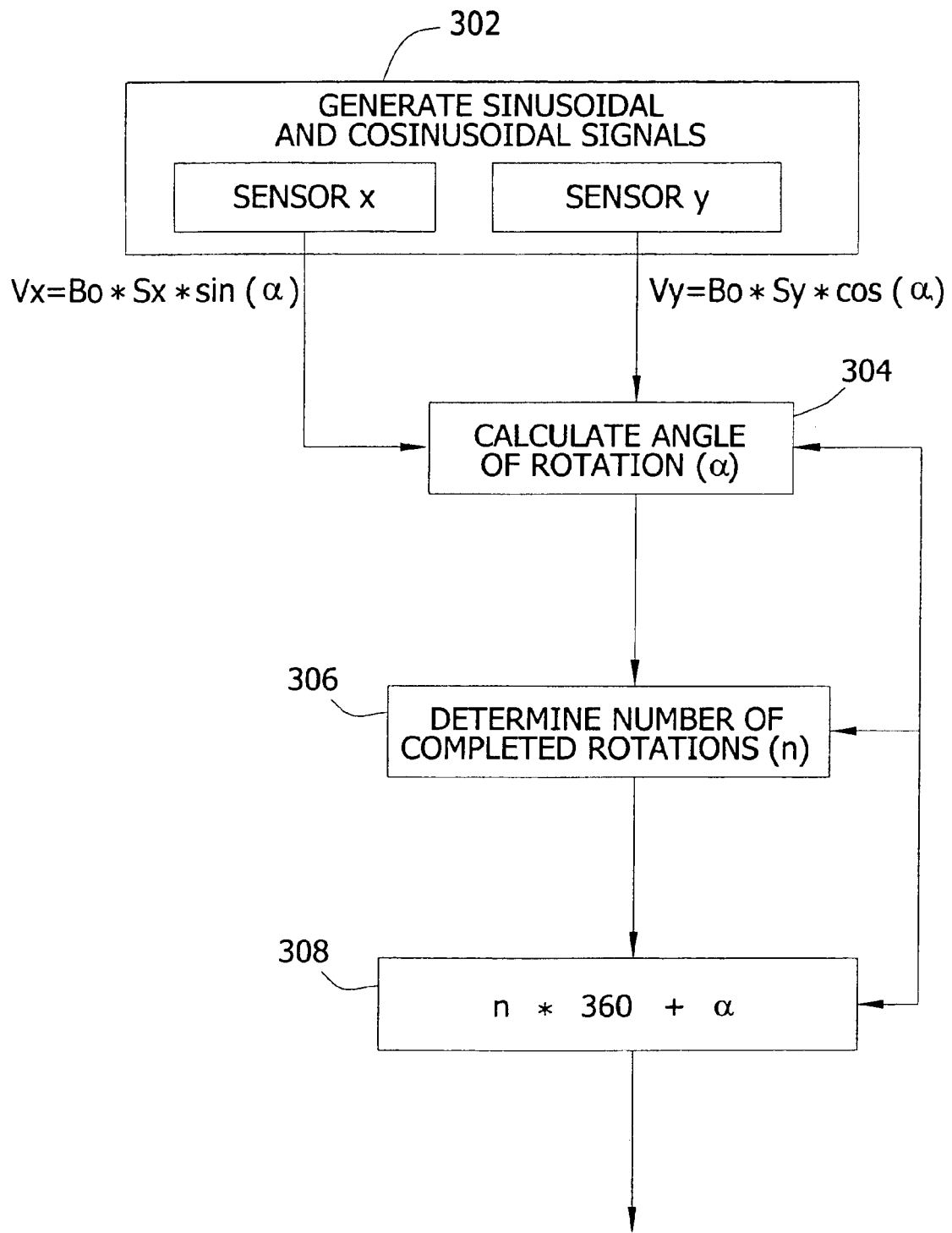

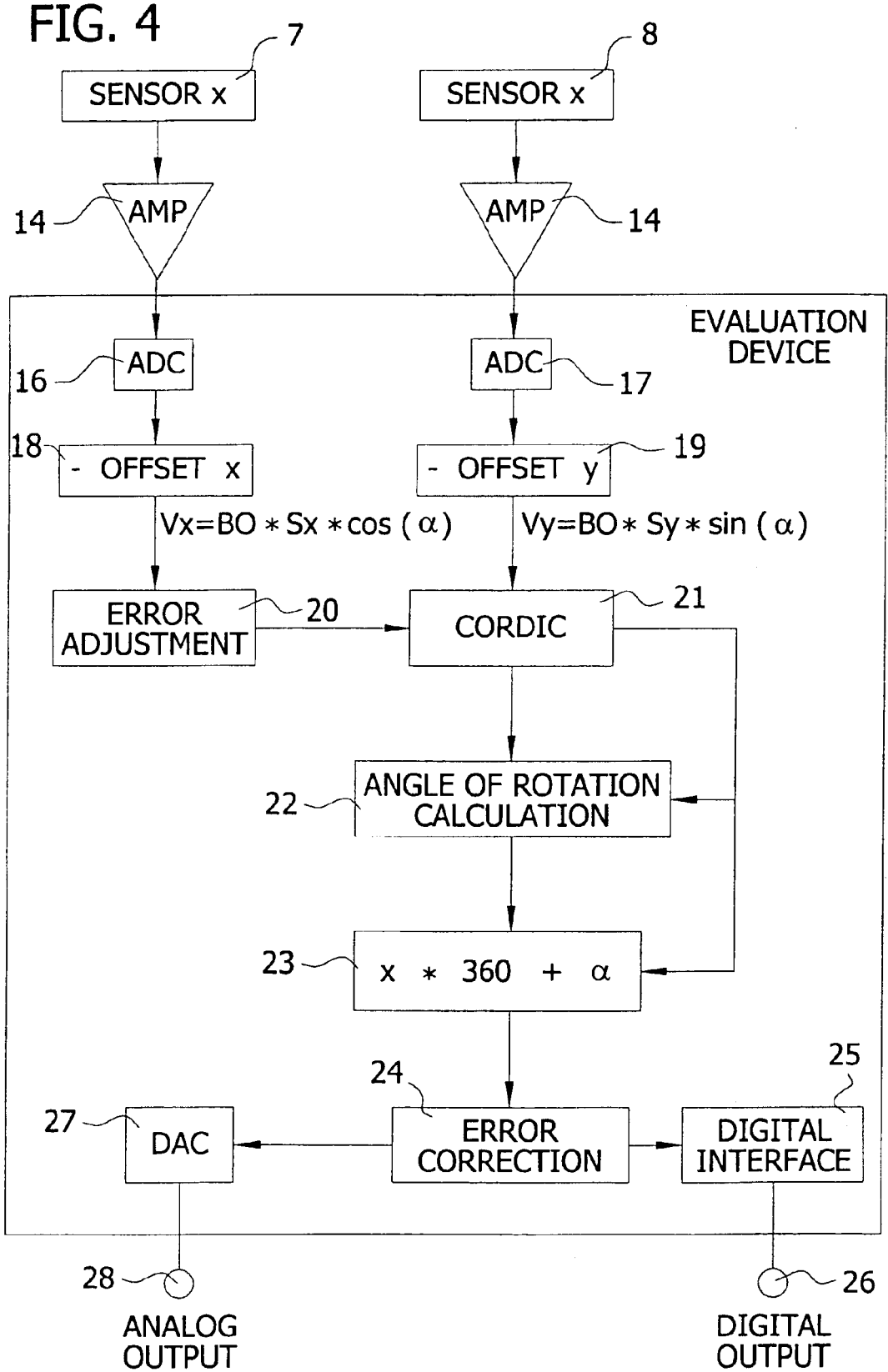

ANGLE OF ROTATION SENSOR

FIELD OF THE INVENTION

The present invention relates to the field of position sensors. More specifically, the invention relates to an angle rotation sensor for detecting an angular position of a rotating element.

BACKGROUND OF THE INVENTION

An angle of rotation sensor is known from German Patent DE 197 47 753 C1. Here, a magnetic field sensor generates sinusoidal and cosinusoidal electrical output signals as a function of the relative rotary position between a magnet attached to a rotating shaft and the sensor. Similar angle of rotation sensors are also known from German Patents DE 195 39 134 A1, DE 44 22 868 A1, DE 41 00 666 A1, and DE 43 01 704 A1.

However, these sensors can detect only an angular range of 0° to 360°, which is insufficient for many application purposes.

German Patents DE 195 06 938 A1, DE 197 39 823 A1, and DE 199 62 241 A1 therefore propose to expand the measurement range to more than 360° and to couple two sensors by means of gears to the shaft whose angle is to be measured, where the gears have different numbers of teeth. In a similar way, European Patent EP 0 386 334 B1 also proposes coupling two continuous potentiometers to the shaft by means of gears with different numbers of teeth. In these cases, the mechanical complexity of the gears is relatively high. In addition, flank errors and play in the gears cause measuring inaccuracies.

German Patent DE 101 40 710 A1 proposes the use of two sensors, one of which has a narrow first angle of rotation measurement range and the other a comparatively larger second angle of rotation measurement range. Here, the first sensor is highly precise and generates a precise linear output signal, while the second sensor is less precise and supplies merely a secondary signal, which is used to determine the period of the output signal of the first sensor. However, expansion of the measurement range beyond 360° requires a translation gear.

German Patent DE 198 13 569 A1 proposes providing a worm with spiral raised sections on the rotating shaft whose angle is to be measured, and attaching a sensor with a magnet opposite these raised sections. During rotation, the shaft displaces these raised sections linearly according to the pitch of the worm, whereby the sensor, namely a Hall element, measures the change inductance as a function of position relative to the raised sections of the worm. German Patents DE 299 14 310 U1, DE 44 37 939 C2, AT 004 639 U1, DE 39 35 261 A1, JP 11211456 A, JP 61283801 A, and DE 37 03 591 C2 thereby suggest converting the rotational motion of the shaft into an axial relative displacement between shaft and sensor.

U.S. Pat. No. 6,411,082 B2 shows an angle of rotation sensor with a magnetic field-sensitive sensor, such as a Hall element, which is mounted stationary in a housing, and with a permanent magnet, which can move linearly relative to the Hall element. The magnet is coupled to a rack, which converts the rotational motion between itself and the housing into a linear motion. The axial distance between magnet and sensor changes according to the rotary position. Since the pitch of the rack is known, a measure of the angle of rotation can be determined from the output signal of the sensor.

However, the latter sensors have less resolving power and thus measuring accuracy than the angle of rotation sensors mentioned in the introduction, which work with sinusoidal and cosinusoidal signals in the measurement range of 0° to 360°.

SUMMARY OF THE INVENTION

Embodiments of the present invention improve the angle of rotation sensor of the type mentioned in the introduction such that it operates with high resolving power in a measurement range of more than 360° and especially of several full rotations.

This and other improvements are realized by the features of the present invention. Advantageous configurations and refinements of the invention also follow.

A principle of the invention is to also move the shaft, whose angle of rotation is to be measured, in the axial direction along a guide track as the shaft rotates about its axis, so that the distance between a magnet and sensor changes during rotation according to the pitch of the guide track. In this way, the amplitude of the sensor output signal changes, which produces a signal from which the number of full rotations completed by the shaft can be determined with sufficient accuracy. On the other hand, a precise signal for an angle in the range from 0° to 360° (e.g., excess rotation angle) can be determined within a full rotation from the sinusoidal and cosinusoidal signals, which is then added to the value of the number of full rotations times 360°.

In one embodiment, the slip guide can be threaded with a linear pitch. The absolute value of the field strength then changes according to a quadratic function ($F(z)=1/z^2$). However, the guide track can also be non-linear and can preferably also follow a quadratic function, whereby the amplitude then changes according to a linear function. Advantageously, the guide track follows a continuous, monotonic function.

Thus, a gross signal is obtained corresponding to the distance in the z-direction between the magnet and sensor, which is sufficient for determining the number of rotations. A fine signal is obtained by evaluating the sinusoidal and cosinusoidal output signals. The total result then has the precision of the fine signal, while the measurement range is expanded to a plurality of rotations. Practical tests have shown that a number of rotations of n=10 can be achieved without additional means.

The evaluation of the gross signal is realized preferably such that a plurality of values of "support points" is stored in a memory, which reproduce, e.g., the corresponding maximum amplitude values of the sinusoidal signal for each period, e.g., at 90°, 270°, etc. Then, an iterative algorithm polls the stored values to determine which two support points surround the gross signal, whereby a value n is obtained, which indicates within which period of the output signal or rotation of the shaft the output signal lies.

The evaluation of the sinusoidal or cosinusoidal signal is realized in principle by means of an arctangent function, which is preferably performed under the use of the known CORDIC algorithm.

Alternatively, the invention may comprise various other methods and apparatuses.

Other features will be in part apparent and in part pointed out hereinafter.

BRIEF DESCRIPTION OF THE FIGURES

In the following, the invention is explained in more detail with reference to an embodiment in connection with the drawing. Shown are:

FIG. 3, a flow chart for explaining the function of an evaluation circuit, which processes the output signals according to FIG. 2; and FIG. 4, a detailed flow chart for explaining the operating principle of the evaluation circuit.

Corresponding reference characters indicate corresponding parts throughout the drawings.

DETAILED DESCRIPTION OF PREFERRED EMBODIMENTS

This application claims priority of German application DE 103 34 869.7, filed Jul. 29, 2003, the entire disclosure of which is explicitly incorporated by reference.

Figure 1:
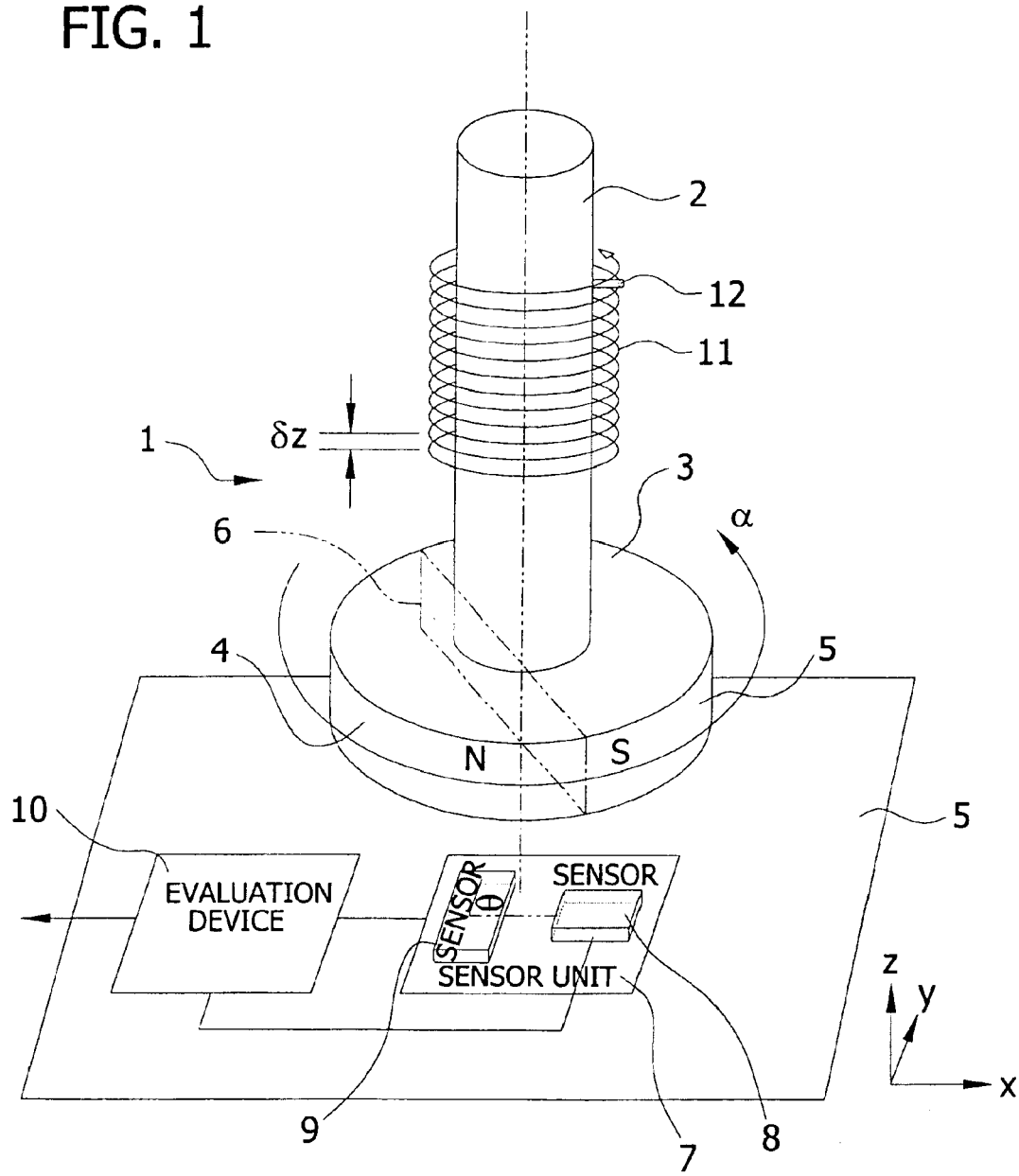
FIG. 1, a schematic diagram of an angle of rotation sensor according to the invention.

The angle of rotation sensor of FIG. 1 is designated in its entirety by the reference character 1. A magnet 3, which has a north pole 4 and a south pole 5, which are separated by an imaginary plane 6, which is parallel to the axis of rotation of the shaft 2, is mounted on a rotary shaft 2, whose angle of rotation a is to be measured. Opposite the magnet 3 there is a sensor unit 7, which contains two magnetic field-sensitive sensors 8 and 9, whose main directions of sensitivity are perpendicular to each other and lie in a plane (x-, y-plane) that is perpendicular to the center axis of the shaft 2. However, it should be mentioned that the two sensors 8 and 9 need not be perpendicular to each other in every case, but can also be aligned at a different angle φ to each other. The sensors 7 and 8 can lie next to each other in the xy-plane, as shown, but they can also be arranged one above the other. In general, any type of magnetic-field sensor can be used, e.g., Hall probes, induction coils, or the like. If the shaft 2, and thus the magnet 3 are turned relative to the sensors 8 and 9, then the flux density of the magnetic field or the magnetic field strength changes and the two sensors generate a periodic output signal, which in principle is sinusoidal, as a function of angle of rotation a. If the two sensors 8 and 9 are aligned in the xy-plane perpendicular to each other, then the two output signals have a 90° phase shift relative to each other, so that one sensor supplies a sinusoidal output signal and the other a cosinusoidal output signal. These output signals are supplied to an evaluation device 10, which evaluates the signals in the way described further below.

With the angle of rotation sensor described thus far, in principle only angles up to one full rotation, i.e., up to 360°, can be measured.

For the detection of a larger angular range, which can include several full rotations, the vertical distance in the z-direction between the magnet 3 and the sensor unit 7 is changed by an amount δz for each complete rotation.

For this purpose, a stationary guide track 11 is provided, which interacts with a guide element 12 on the shaft 2. In simple case, the guide track 11 and guide element 12 can be spiral threads with a constant pitch, so that the magnet 3 changes its distance to the sensor unit 7 proportional to the angle of rotation α, where in this case, the change in distance in the z-direction for each complete rotation corresponds to the value δz. The field strength measured by each sensor 8 and 9 then changes as a function of the distance in the z-direction according to a function $1/z^2$.

However, instead of threads for the guide track 11 and the guide element 12, other guides can also be used, e.g., a sliding block guide 11 with a tracing pin 12. The pitch of the sliding block guide then need not be constant but must merely follow a monotonic function. This function can be, e.g., a quadratic function, which can compensate for the quadratic dependency of the sensor output signals on the distance in the z-direction.

Figure 2:
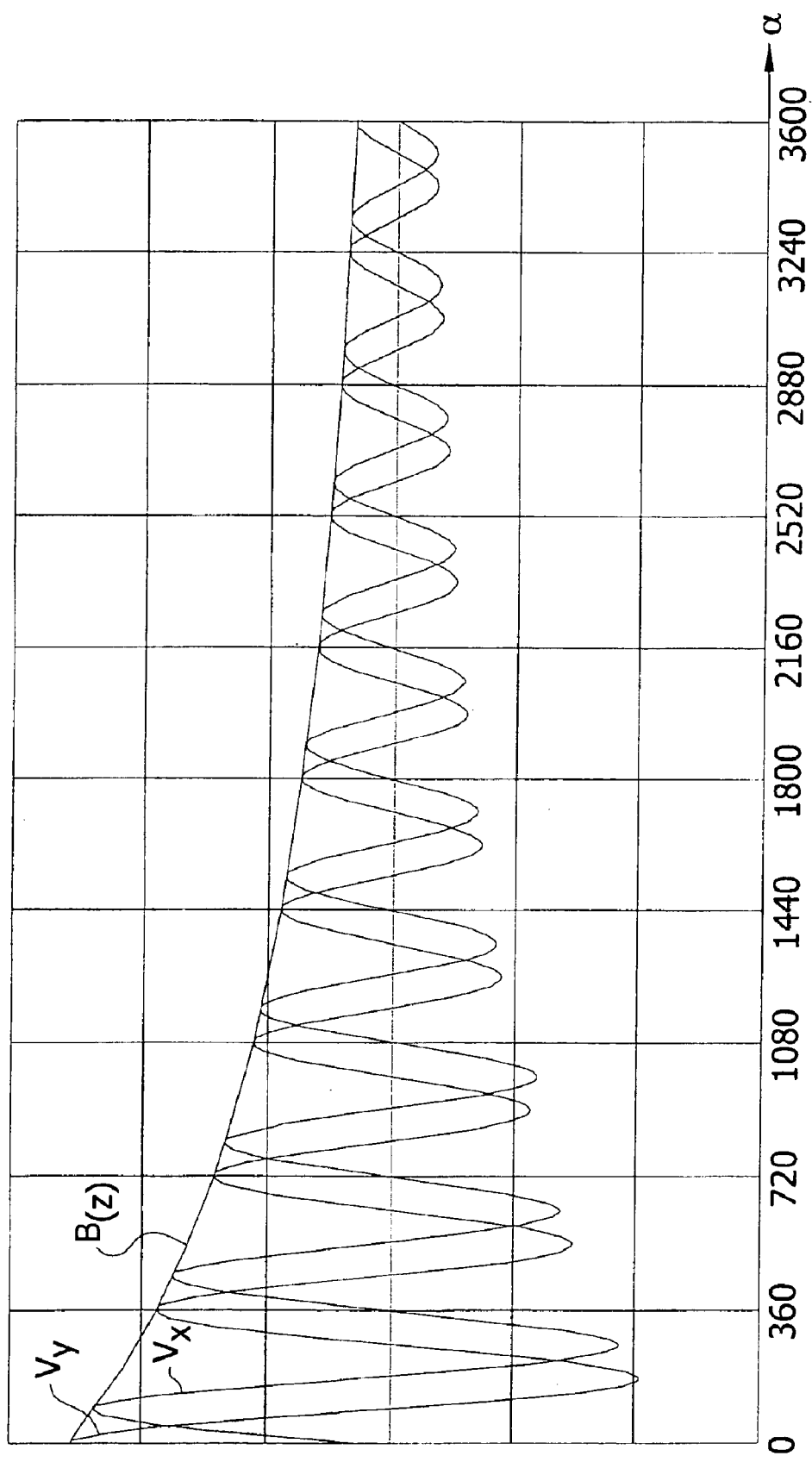
FIG. 2, a diagram of the sinusoidal and cosinusoidal output signals of the applied sensor elements.

FIG. 2 shows the dependency of the output signals $V_x$ and $V_y$ of sensors 7 and 8 as a function of angle of rotation a, which in the shown example can equal 3600°, thus ten full rotations. Here, the curve $V_x$ is a sinusoidal signal and the curve $V_y$ is a cosinusoidal signal, as long as the two sensors 7 and 8 are aligned at exactly 90° to each other in the xy-plane relative to their forward direction. As already mentioned, however, the sensors can also be offset by a different angle φ, wherein the signals $V_x$ and $V_y$ then generally have a phase shift by the angle φ.

The curve $B_z$ shows the dependency of the two output signals $V_x$ and $V_y$ on the distance between the sensors 8 and 9 and the magnet 3, which runs here at a linear pitch of the slip guide 11, 12 according to a quadratic function ($1/z_2$ [sic; $z^2$]) and acts as an envelope for the signals $V_x$ and $V_y$. A signal corresponding to curve $B_z$ can be calculated according to the relationship $\sin^2\alpha + \cos^2\alpha = 1$, from which the angle α can be determined. However, because the curve $B_z$ is very flat for larger angle ranges, such an evaluation would produce minimal sensitivity or minimal resolving power. Therefore, the curve $B_7$ is generally used only to determine how many full rotations n the angle of rotation sensor has completed, where $n=0$ for $0 \leq \alpha \leq 360°$ $n=1$ for $360 \leq \alpha \leq 720°$ etc.

On the other hand, within the individual full rotations, a fine evaluation is performed by evaluating sinusoidal and cosinusoidal signals $V_x$ and $V_y$.

The connection between the magnetic field strength as a function of distance z reads in gross approximation:

$$B(z) = \frac{B_0 * h^2}{(z+h)^2}$$

where h=edge length of magnet and $B_0$=flux density at z=0, i.e., 0 mm distance.

Because the sensors only register the flux density components in the direction of their sensitivity, they have a sinusoidal or cosinusoidal output signal. The relationship reads:

$V_x(\alpha;z) = B(z) * S_x * \cos(\alpha)$ $V_y(\alpha;z) = B(z) * S_y * \sin(\alpha)$ where α=angle between magnetic field main direction and sensitivity direction of the y-sensor; $S_x$, $S_y$=sensitivity of the sensors in x- and y-directions, respectively.

Consequently, the two sensors 8 and 9 measure the x- and y-components, respectively, of the magnetic field and therefore have the profiles shown in FIG. 2 in the curves $V_x$ and $V_y$.

If one assumes that the two sensors 8 and 9 each have the same sensitivity, then $$|B(z)| = \frac{\sqrt{V_x^2(\alpha;z) + V_y^2(\alpha;z)}}{S_0}$$

and $$\tan\alpha = \frac{V_y(\alpha; z)}{V_x(\alpha; z)}$$

from which it follows that:

$$\alpha = \arctan\left(\frac{V_y(\alpha; z)}{V_x(\alpha; z)}\right)$$

There are several calculation possibilities using a microcontroller or an ASIC. On the one hand, the arctangent function can be realized by a series expansion, which is relatively time consuming; on the other hand, tables stored in memory can be used for the arctangent function, which results in a large space requirement for the memory. An efficient method is to perform a coordinate transformation, which is possible, e.g., using the known CORDIC algorithm (Coordinate Rotation Digital Computing). For a required calculation accuracy, this algorithm always requires the same number of cycles and uses only addition and shift operations. It is also excellently suited for realization in pure hardware, which permits a high computation rate.

From the arctangent function given above, an angle signal is given in a range from 0° to 360°. Furthermore, there is the magnitude signal of B(z). To obtain information on how many full rotations the angle of rotation sensor has completed from these signals, it is in principle possible to linearize the signal B(z) by an inverse function and to determine from this the number of rotations. However, this has proven to be computation-intensive due to the division and root calculation. It is simpler to compare the signal with preset, stored values and to obtain the information in this way. Therefore, preferably a number k of support points is provided with k=(n*2)+2 where n=number of rotations to be measured.

In order not to produce erroneous assignments at the corresponding jump positions from 360° to 0°, a computational routine is necessary, which considers the actual angle. Such a routine could look like the following:

```
Rounding calculation with error recognition
    for (i=0;i<22;i++)
    {
        if ((amount>=supportpoint[i]&&angle<180))
        {
            i=(i>>1);
            break;
        }
        else if ((amount>=supportpoint[i]&&angle>180))
        {
            i=(i>>1)-1);
            break;
        }
        i++
        if (amount>supportpoint[i])
        {
            i=(i-1)>>1;
            break;
        }
    }
END Rounding calculation with error recognition
```

Here, the value that the variable "1" takes on after the for-loop is exited is the actual rounding number. The support points [i] (i=0 ... 21) are the amounts for the angles 90°, 270°, 450°, 360° ...

The support points must be measured once and stored before startup of the sensor.

FIG. 3 shows a flow chart for the calculations described above. At 302, two sensors 8 and 9, which are here designated as sensor x and sensor y, supply the two signals $V_x$ and $V_y$. From here, the angle $\alpha$ is calculated, preferably by a coordinate transformation, in the range of one full rotation, thus only in the range from 0° to 360° at 304.

In another step at 306, with reference to the above function B(z), it is determined how many rotations x the angle of rotation sensor has completed. In a last step, the number of rotations x is multiplied by 360°, and the angle $\alpha$, which lies only in the range from 0° to 360°, is added at 308.

FIG. 4 shows the flow chart of FIG. 3 in somewhat more detail. The output signals of sensors 7 and 8 are initially supplied to analog amplifiers 14 and 15 and then digitized by analog/digital converters (ADCs) 16 and 17. Then possible offset errors are corrected in computational elements 18 and 19 and one of the output signals $V_x$ or $V_y$ is corrected with reference to a possible error adjustment (20). Then the coordinate transformation is performed, preferably according to the CORDIC method (block 21) described above and then, as described in connection with FIG. 3, rotation recognition (block 22) is performed and the number of rotations n multiplied by the angle 360° is added to the fine angle output by the CORDIC block 21 (block 23).

Then another error correction can be performed. For this purpose, during the initial calibration of the angle of rotation sensor, error values are measured and stored at individual angles, which are then corrected in the error correction (block 24). The final output signal can then be output by means of a digital interface 25, a digital output 26, or a digital/analog converter (DAC) 27 to an analog output 28.

If the two sensors 7 and 8 are aligned with their advancing directions not perpendicular to each other, but instead at an angle $\phi$ different from 90°, then one signal has the form $\sin(\alpha)$ and the other $\sin(\alpha+\phi)$. The cosinusoidal signal then can be determined as follows:

$$\cos(\alpha) = \frac{\sin(\alpha+\varphi)}{\sin(\varphi)} - \frac{\sin(\alpha)}{\tan(\varphi)}$$

Then, in the same way as described above, additional processing can be performed with these signals.

From the above, it can also be seen that the amount B(z) can be relatively imprecise. Only the values at the support points mentioned above need be unambiguously distinguishable from each other. The algorithm described above polls the stored values successively from above or below (according to the value) to determine which two successive support points surround this value, wherein the number of rotations can then be determined unambiguously.

If the pitch of the slip guide 11, 12 is not linear, but instead follows, e.g., a quadratic function, then the function B(z) can also be linearized, wherein the evaluation is simplified. Also for a linear function of B(z), the support point method described above can be used. Alternatively, the integer portion of a division by 360° can also be used to determine the integer value of rotations.

The order of execution or performance of the methods illustrated and described herein is not essential, unless otherwise specified. That is, elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. An angle of rotation sensor with a rotary shaft, a magnet coupled to the rotary shaft, and a magnetically sensitive sensor element, which generates a sinusoidal output signal and a cosinusoidal output signal as a function of the relative angle of rotation between the magnet and the sensor element, and with an evaluation unit, which generates from the output signals a signal corresponding to the angle of rotation, characterized in that the shaft is also moved linearly parallel to its axis along a guide track when the shaft rotates about its axis, so that the distance between magnet and sensor changes corresponding to a pitch of the guide track, and the evaluation unit determines from the generated sinusoidal and cosinusoidal output signals of the sensor element a signal, from which the distance between the sensor element and the magnet, and thus a number of full rotations of the shaft, can be determined, wherein from the generated sinusoidal and cosinusoidal output signals a fine signal within a full rotation is determined and this fine signal is added to the full rotation value multiplied by 360°.

2. The angle of rotation sensor of claim 1 wherein the guide track comprises threads with constant pitch.

3. The angle of rotation sensor of claim 1 wherein the guide track is a sliding block guide, which is coupled by means of a tracing pin to the shaft.

4. The angle of rotation sensor of claim 3 wherein the guide track is continuous and monotonic, but not linear, and preferably follows a quadratic function $F(z)=1/z^2$.

5. The angle of rotation sensor of claim 4 wherein the fine signal is performed within a measurement range from 0° to 360° by a coordinate transformation according to a CORDIC algorithm.

6. The angle of rotation sensor of claim 5 wherein the evaluation unit has a memory, in which values of support points are stored, and for determining the number of rotations, it is determined which two successive values of support points surround the actual value of the measured field strength.

7. An apparatus for measuring an angle of rotation of a rotary shaft, said rotary shaft being rotatable about an axis of rotation and having a magnet coupled thereto, said apparatus comprising:
  a magnetically sensitive sensor element for generating a sinusoidal output signal and a cosinusoidal output signal as a function of a relative angle of rotation between the magnet and the sensor element;
  a guide track allowing movement of the shaft in a direction substantially parallel to the axis of rotation as the shaft rotates such that a distance between the magnet and the sensor element changes corresponding to a pitch of the guide track;
  an evaluation unit for generating a signal B(z) as a function of the sinusoidal and cosinusoidal output signals generated by the sensor element, said signal B(z) being representative of the distance between the sensor element and the magnet and, thus, a number of full rotations of the shaft, said evaluation unit further generating a fine signal as a function of the sinusoidal and cosinusoidal output signals generated by the sensor element, said fine signal being representative of a partial rotation and is added to the number of full rotations multiplied by 360°.

8. The apparatus of claim 7 wherein the guide track comprises threads having a substantially constant pitch.

9. The apparatus of claim 7 wherein the guide track is a sliding block guide coupled to the shaft by a tracing pin.

10. The apparatus of claim 9 wherein the guide track is substantially continuous and monotonic, but not linear.

11. The apparatus of claim 10 wherein the guide track follows a quadratic function $F(z)=1/z^2$ where z is the distance between the magnet and the sensor element.

12. The apparatus of claim 10 wherein the fine signal is performed within a measurement range from 0° to 360° by a coordinate transformation according to a CORDIC algorithm.

13. The apparatus of claim 12 wherein the evaluation unit has a memory storing support point values, said support point values corresponding to maximum amplitude values of the sinusoidal output signal for various angles of rotation, and wherein the evaluation unit determines the number of full rotations by determining which two successive values of support points surround the actual value of the signal B(z).

14. The apparatus of claim 7 wherein the magnetically sensitive sensor element comprises a first sensor for generating the sinusoidal output signal and a second sensor for generating the cosinusoidal output signal.

15. A method for measuring an angle of rotation of a rotary shaft, said rotary shaft being rotatable about an axis of rotation and having a magnet coupled thereto, said method comprising:
  receiving a sinusoidal output signal and a cosinusoidal output signal from a magnetically sensitive sensor element, said sinusoidal and cosinusoidal output signals being representative of a relative angle of rotation between the magnet and the sensor element;
  moving the shaft along a guide track in a direction substantially parallel to the axis of rotation as the shaft rotates such that a distance between the magnet and the sensor element changes corresponding to a pitch of the guide track;
  determining a number of full rotations of the shaft as a function of the distance between the sensor element and the magnet;
  determining an amount of partial rotation as a function of the sinusoidal and cosinusoidal output signals from the sensor element; and
  adding the amount of partial rotation to the number of full rotations multiplied by 360° to calculate the angle of rotation of the shaft.

16. The method of claim 15 wherein the guide block comprises a sliding block guide and further comprising coupling the sliding block guide to the shaft by a tracing pin.

17. The method of claim 15 wherein determining the amount of partial rotation comprises performing a coordinate transformation according to a CORDIC algorithm within a measurement range from 0° to 360°.

18. The method of claim 15 further comprising storing support point values corresponding to maximum amplitude values of the sinusoidal output signal for various angles of rotation, and wherein determining the number of full rotations comprises determining which two successive values of support points surround an actual value of a signal B(z).

* * * * *